(12) United States Patent
Touma

(10) Patent No.: US 11,603,994 B2
(45) Date of Patent: Mar. 14, 2023

(54) REMOVABLE OVEN FOR GRILL

(71) Applicant: Albert Touma, Houston, TX (US)

(72) Inventor: Albert Touma, Houston, TX (US)

(*) Notice: Subject to any disclaimer, the term of this patent is extended or adjusted under 35 U.S.C. 154(b) by 247 days.

(21) Appl. No.: 16/951,815

(22) Filed: Nov. 18, 2020

(65) Prior Publication Data

US 2021/0080118 A1    Mar. 18, 2021

Related U.S. Application Data

(60) Division of application No. 16/218,124, filed on Dec. 12, 2018, now Pat. No. 10,876,738, which is a continuation-in-part of application No. 15/150,058, filed on May 9, 2016, now Pat. No. 10,190,781, which is a continuation-in-part of application No. 13/535,080, filed on Jun. 27, 2012, now Pat. No. 9,383,108.

(51) Int. Cl.
| | |
|---|---|
| *F24C 15/30* | (2006.01) |
| *F24B 1/26* | (2006.01) |
| *F24B 1/182* | (2006.01) |
| *F24B 1/00* | (2006.01) |
| *A47J 37/06* | (2006.01) |

(52) U.S. Cl.
CPC .......... *F24C 15/30* (2013.01); *A47J 37/0623* (2013.01); *F24B 1/003* (2013.01); *F24B 1/182* (2013.01); *F24B 1/26* (2013.01)

(58) Field of Classification Search
None
See application file for complete search history.

(56) References Cited

FOREIGN PATENT DOCUMENTS

| | | | |
|---|---|---|---|
| JP | 2009012824 A | * | 1/2009 |
| JP | 2009012824 A | | 1/2009 |

* cited by examiner

*Primary Examiner* — Jason Lau
(74) *Attorney, Agent, or Firm* — Crain Caton & James; William P. Jensen

(57) ABSTRACT

A removable oven for use on a cooking grill including a cooking chamber formed in a high temperature housing with an open bottom. The open bottom of the high temperature housing fits over a cooking plate positioned over a shutterable perforated diffuser place on the grill. A segmented chimney connected to the cooking chamber further controls the heat in the cooking chamber.

3 Claims, 17 Drawing Sheets

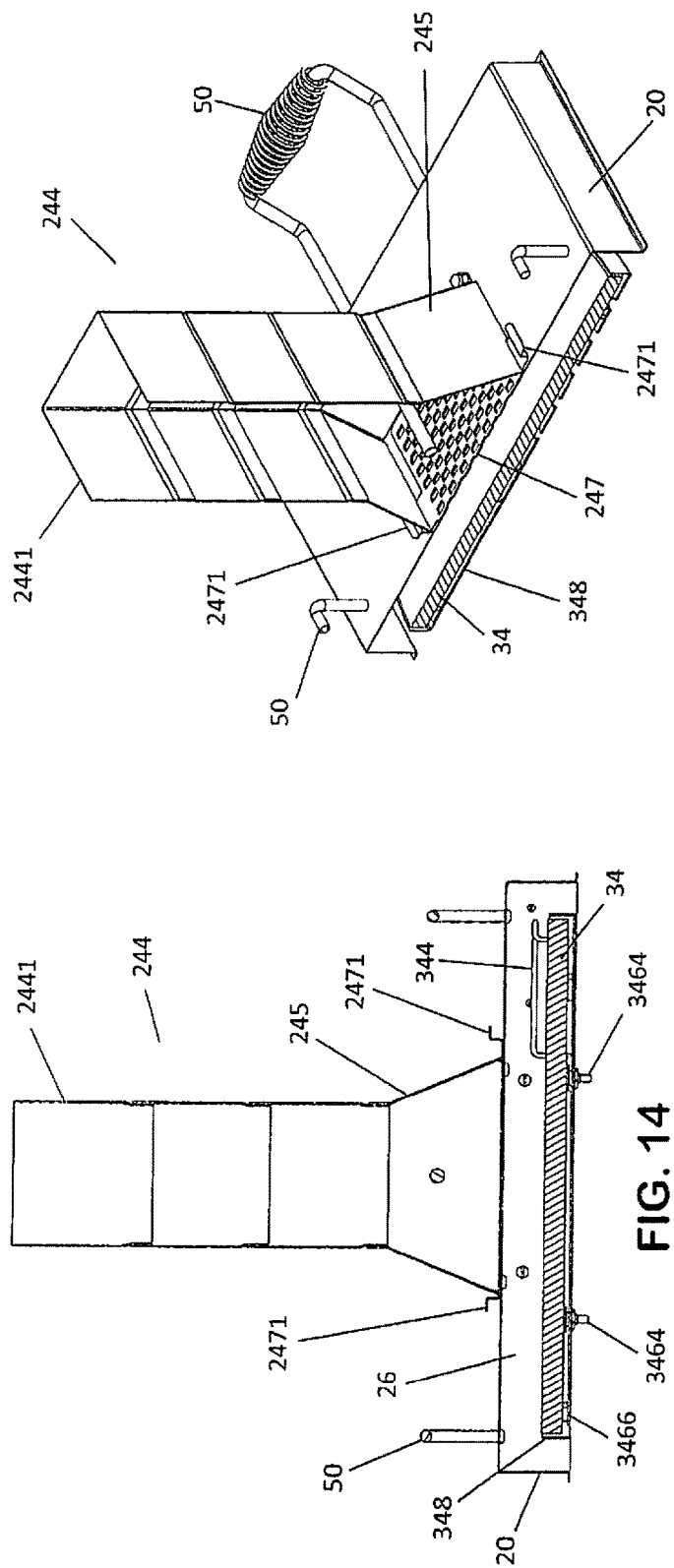
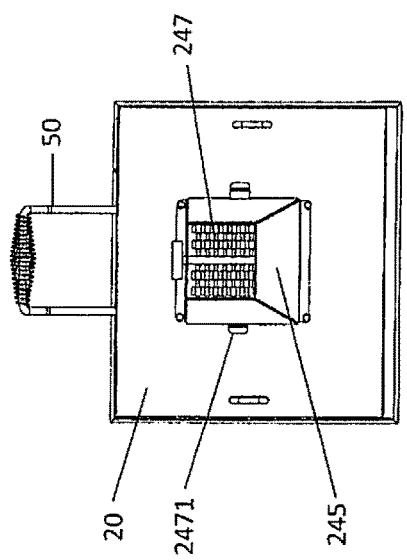
FIG. 15
FIG. 13
FIG. 14

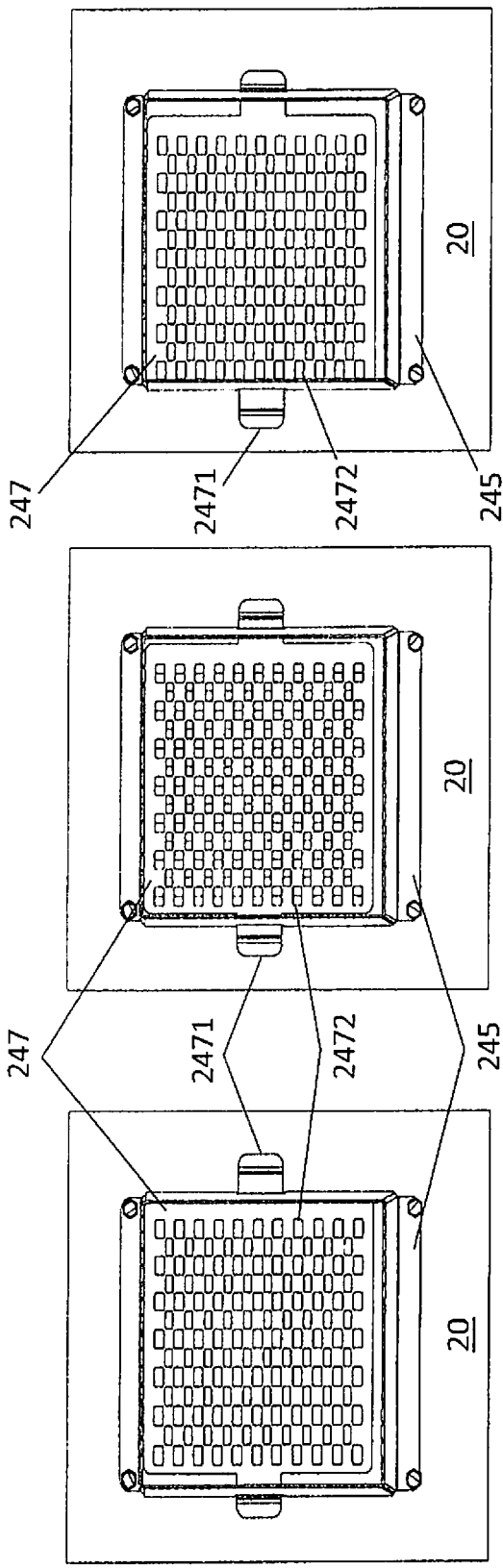

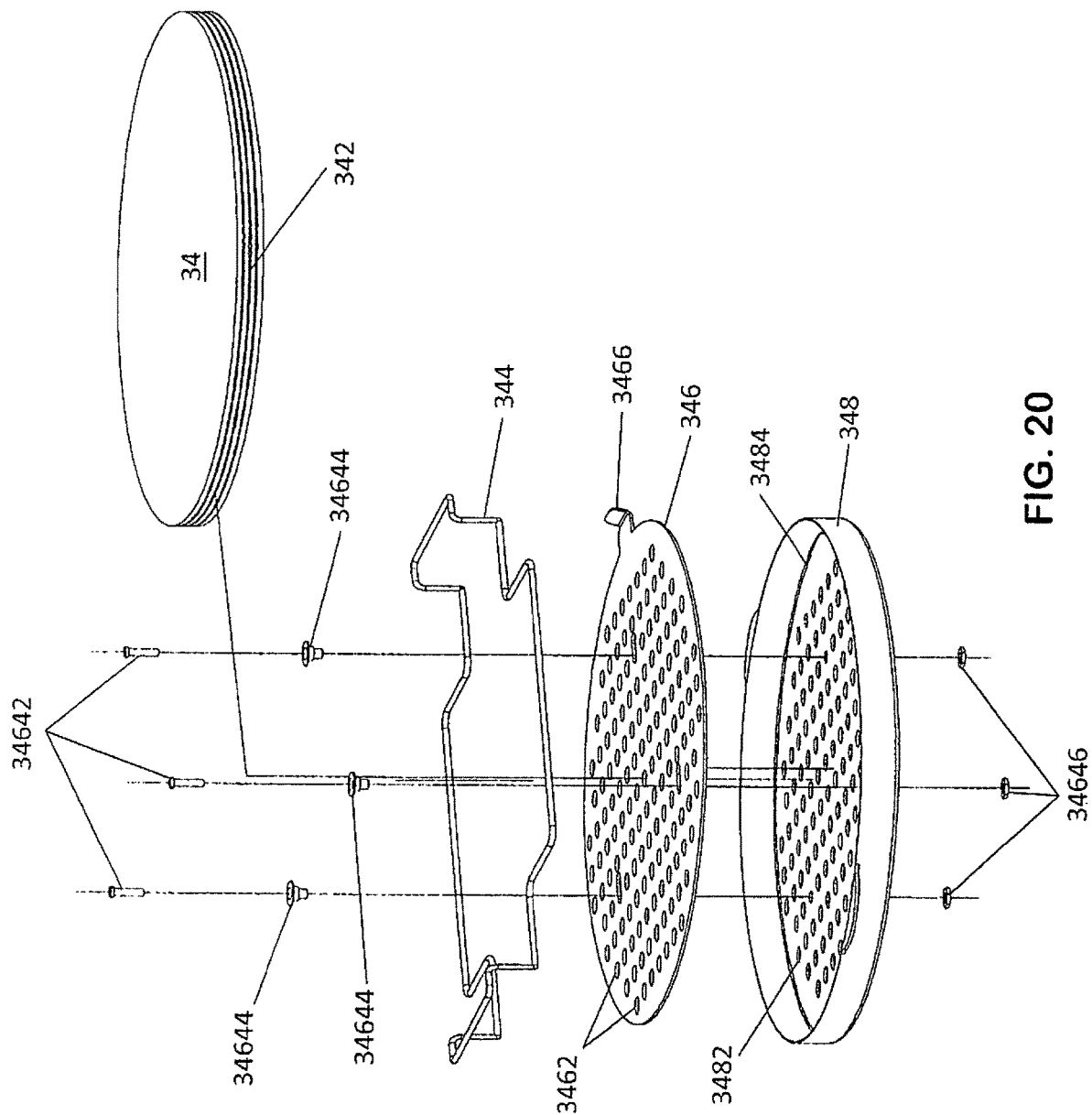

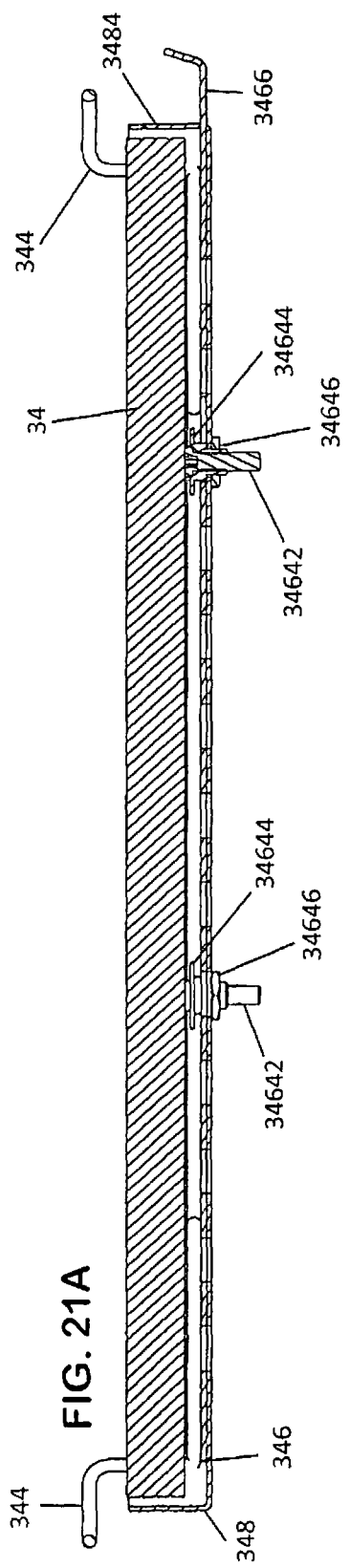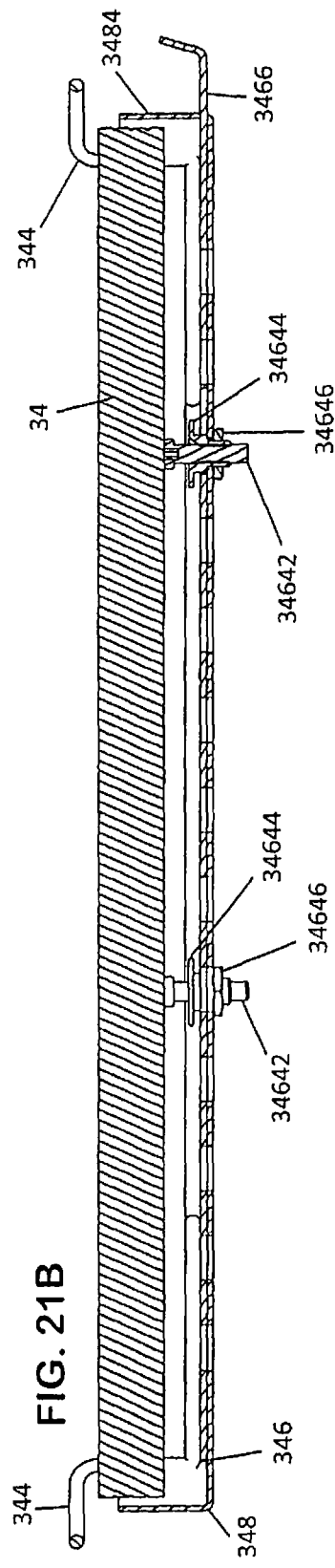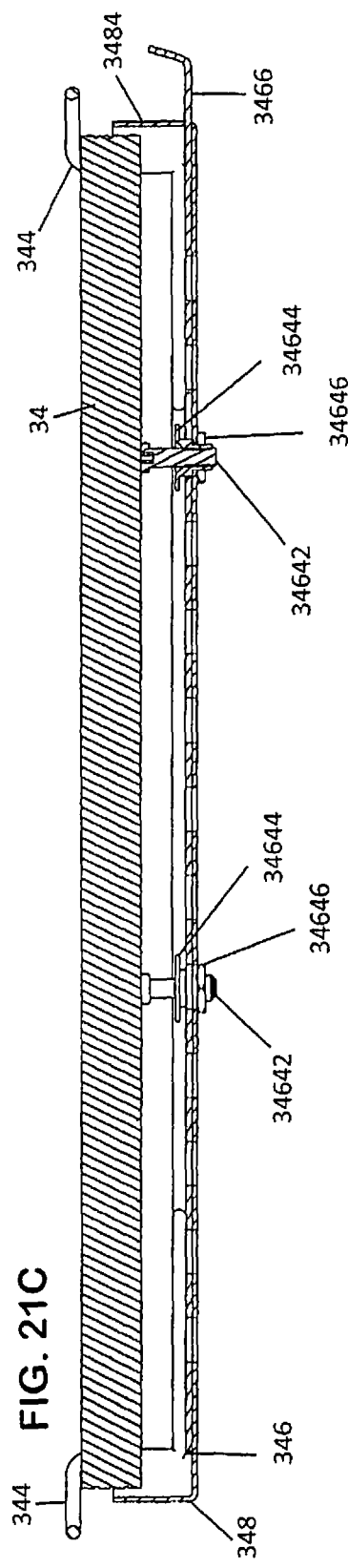

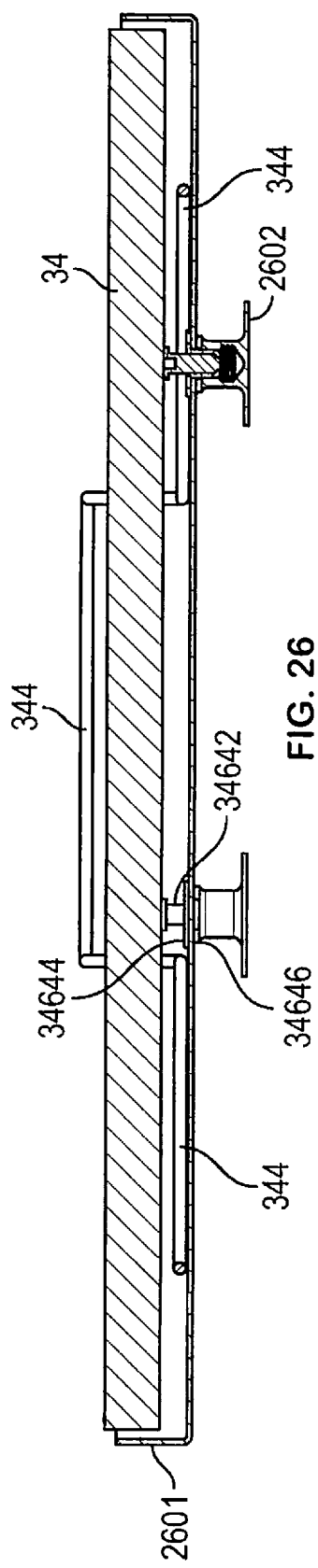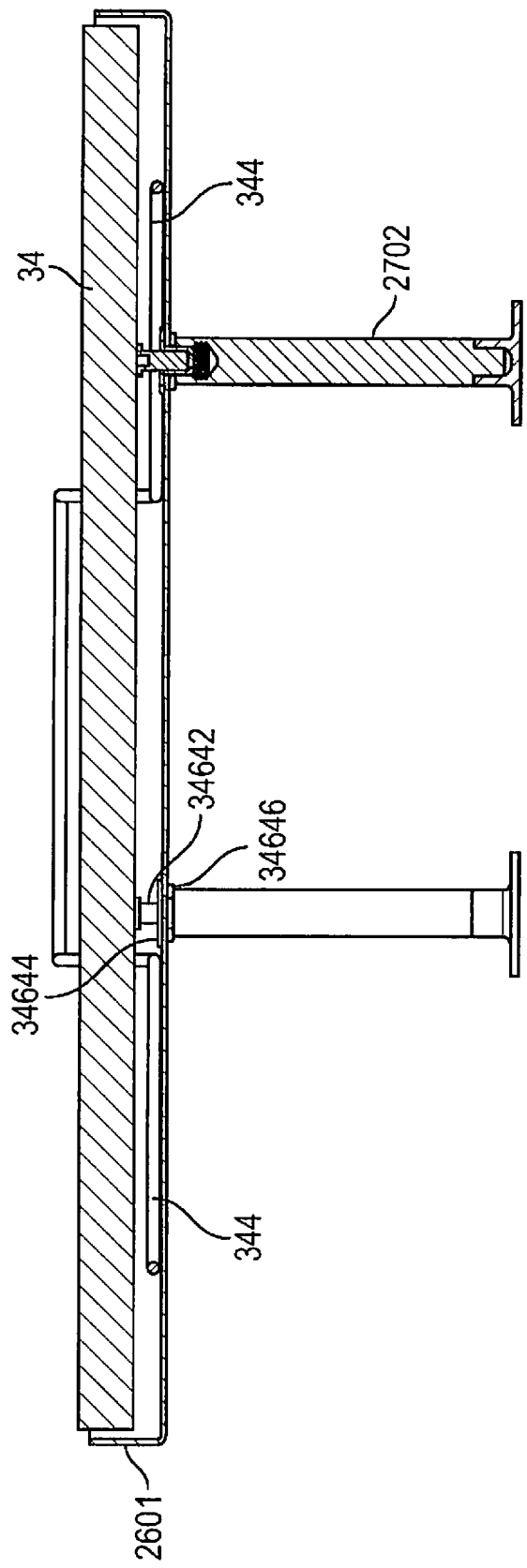

REMOVABLE OVEN FOR GRILL

CROSS-REFERENCE TO RELATED APPLICATIONS

This application is a divisional of U.S. patent application Ser. No. 16/218,124, filed Dec. 12, 2018, which is a continuation-in-part of U.S. patent application Ser. No. 15/150,058, filed May 9, 2016, which is a continuation-in-part of U.S. Pat. No. 9,383,108, issued Jul. 5, 2016, all of which are incorporated herein by reference.

FIELD OF THE DISCLOSURE

The present invention relates to a grill for cooking and more particularly, is directed to a removable oven for a grill.

BACKGROUND

There are a number of ovens to cook food. Most modern ovens are built for the specific purpose of cooking food inside a building or home. The heat for modern ovens is typically provided by the combustion of natural gas, electrical resistance, electrical induction or microwave. Most consumer type ovens are incapable of reaching the temperatures achieved in a commercial oven, regardless of the fuel source. And to reach such temperatures in a consumer type oven can be expensive not only for the construction of the oven itself but also the space in which the high temperature oven is installed.

The typical outdoor grill whether gas, charcoal or wood fired provides an abundant high temperature heat source to achieve the temperatures found in a commercial oven. Unfortunately, the cooking chamber in the typical outdoor grill is either too large or inadequate to cook food through radiant and/or convection heat. Ovens like the one disclosed by Gustavsen in U.S. Pat. No. 8,578,927, provide a smaller cooking chamber, but are inefficient in the control, retention and direction of the heat by virtue of the use of a baffle and always open cooking chamber. While the Gustavesen oven has an open cooking chamber at all time for ease of accessing the food being cooked, it does not create or maintain a consistent heat field across the cooking chamber. Finally, the Gustavsen oven does not have any means to control the flow of heat across the cooking chamber or the temperature in the heated gap between the cooking stones.

Inserts and apparatus used with an intense and variable heat source, like an outdoor grill, attempt to control the amount of heat directed to a bottom portion of the food to be cooked by use of at least one diffuser between the cooking surface and heat source. Such devices are disclosed by: Denny in Patent Application Publication US 2005/0039612, Bryce in Patent Application US 2010/0294138, Chen in U.S. Pat. No. 5,365,833, Zuccarini in U.S. Pat. No. 6,187,359, Stark in U.S. Pat. No. 6,640,695, Cuomo in U.S. Pat. No. 7,219,663, Iakossavas in U.S. Pat. No. 7,790,213, Krolick et al in U.S. Pat. No. 9,016,191, and Dahle et al in U.S. Pat. No. 9,182,129. However, none of these devices offer a way to control the amount of heat being diffused to the cooking surface and alter the temperature above the cooking surface without increasing the temperature of the cooking surface itself. Without such control food is not cooked evenly on top and bottom.

A removable oven for use on a cooking grill including a cooking chamber formed in a high temperature housing with an open bottom. The open bottom of the high temperature housing fits over an adjustable perforated pan disposed between a cooking plate and the cooking grill. A chimney connected to the cooking chamber further controls the heat within the cooking chamber. The cooking plate can be variably positioned above the perforated diffuser pan by at least one adjustable stand thereby altering the distance between the pan. A sliding shutter fixed adjacent to the perforated diffuser pan allows a user to block or alter the flow of heated air through the perforated diffuser pan. With the shutter in the blocked positioned, heated air from below is directed to and travels over the periphery of the diffuser into the cooking chamber above the cooking plate. The present invention is an efficient removable oven for a cooking grill that can be manufactured at a low cost and operated without any special skills. Other and further objects, benefits, and advantages of the instant invention have been described above, and further below.

BRIEF DESCRIPTION OF THE DRAWINGS

The present disclosure is described with reference to the accompanying drawings, in which like elements are referenced with like reference numbers, and in which:

FIG. 13 is a top view of a removable oven 10 depicting a high temperature housing 20, chimney base 245, chimney shutter 247, chimney shutter tab 2471 and handles 50.

FIG. 14 is a cross section plan view of a removable oven 10 depicting a high temperature housing 20, chimney 244, chimney segments 2441, chimney shutter tab 2471, chimney base 245, cooking plate 34, wire frame 344, perforated diffuser pan 348, adjustable stands 3464, diffuser shutter tab 3466 and handles 50.

FIG. 15 is an isometric cross section view of a removable oven 10 depicting a high temperature housing 20, cooking plate 34, diffuser pan 348, chimney 244, chimney segments 2441, chimney base 245, chimney shutter 247, chimney shutter tab 2471, and handles 50.

FIG. 16A through 16C are top views of a removable oven 10 depicting a high temperature housing 20, chimney shutter 247, chimney shutter tab 2471, holes 2472, and chimney base 245. FIG. 16A depicts an open position of chimney shutter 247. FIG. 16B depicts a partially open position of chimney shutter 247. FIG. 16C depicts a closed position of chimney shutter 247.

FIG. 20 is an isometric exploded view of a cooking plate 34, periphery 342, wire frame 344, shutter 346, shutter apertures 3462, adjustable stands components 34642, 34644, 34646, diffuser shutter tab 3466, diffuser pan 348, and perforations 3482.

FIGS. 21A through 21C are cross sectional views depicting the variable heights of cooking plate 34 in a wire frame 344 above diffuser pan 348 by adjustable stands 3464.

FIG. 22A depicts the shutter 346 in an open position. FIG. 22B depicts the shutter 346 in a partially open position. FIG. 22C depicts the shutter in a closed position.

FIG. 26 is a cross-section elevation-view depicting another embodiment that includes a solid diffuser pan supported by a plurality of stands having a predetermined height and an adjustable lower cooking plate.

FIG. 27 is a cross-section elevation view depicting another embodiment that includes a solid diffuser pan supported by a plurality of stands having another predetermined height and an adjustable lower cooking plate.

DETAILED DESCRIPTION OF THE ILLUSTRATIVE EMBODIMENTS

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

In one embodiment, the present disclosure includes an adjustable cooking plate comprising: i) a diffuser pan supported by at least one stand on a cooking grill, each stand having a predetermined height and threadably connected to a respective adjustable screw; ii) at least one adjustable screw coupled to and projecting away from said diffuser pan for supporting the cooking plate and adjusting a height of the cooking plate inside the diffuser pan; and iii) wherein each screw includes a respective nut passing through said diffuser pan for coupling each screw to the diffuser pan.

Figure 1:
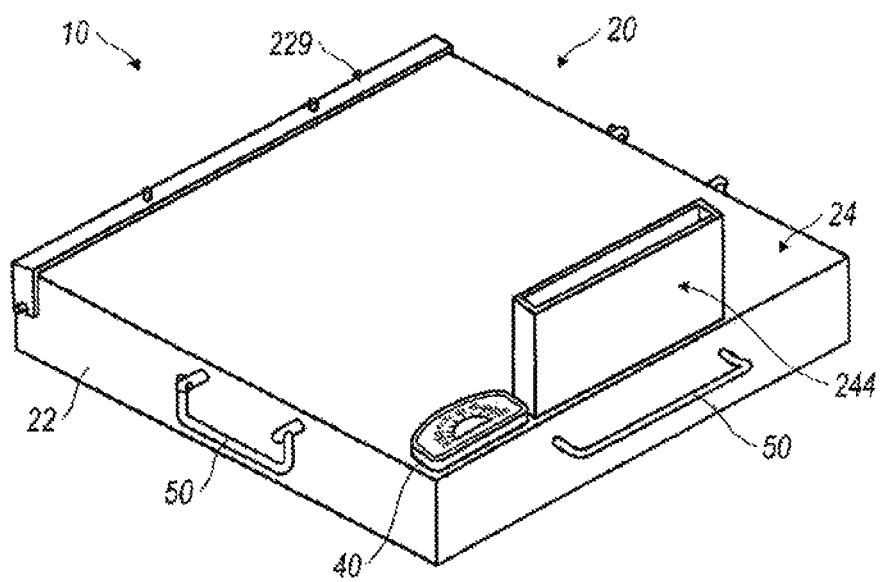
FIG. 1 depicts an isometric view of removable oven.
Figure 2:
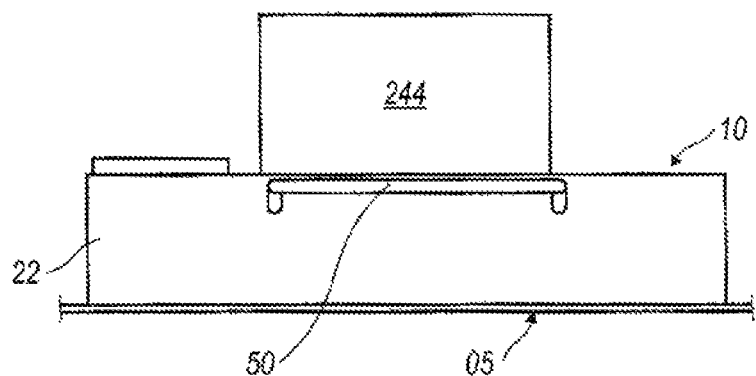
FIG. 2 is a front view of a removable oven depicting the handle 50 and chimney 244.
Figure 8:
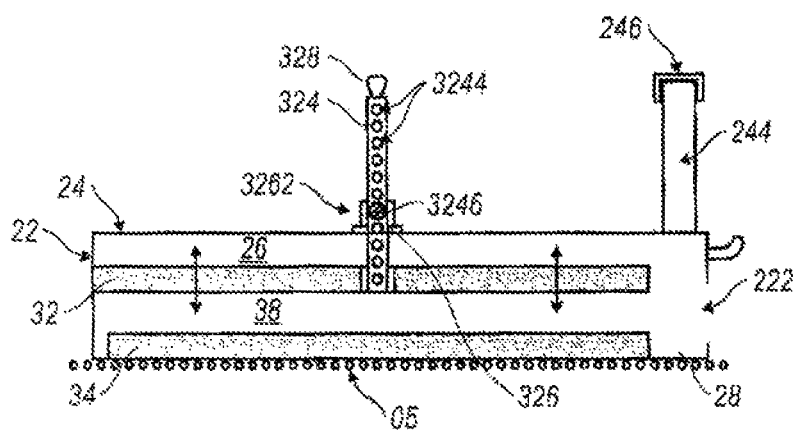
FIG. 8 is a cross section plan view of a removable oven depicting a cooking chamber 26 in a high temperature housing 20 with a pair of cooking plates 30 with an upper cooking plate 32 that can be adjusted by a stem 324 with a series of holes 3244 and a pin 3246.
Figure 9:
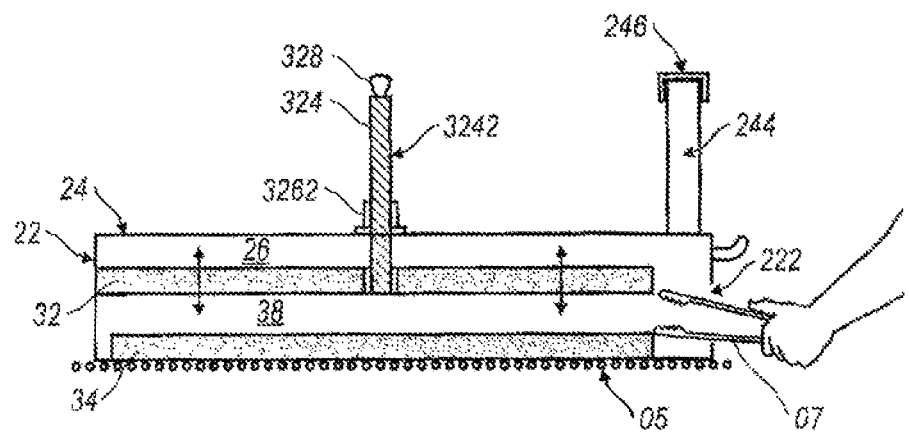
FIG. 9 is a cross section plan view of a removable oven depicting a cooking chamber 26 in a high temperature housing 20 with a pair of cooking plates 30 with an upper cooking plate 32 that can be adjusted by a threaded stem 3243.

Referring to FIG. 1, the present invention is a removable oven 10 for a grill 05. Beneath the grill 05 is a heat source 03 which can be provided by the combustion of natural gas, wood, or charcoal. See FIG. 6. The removable oven 10 includes a cooking chamber 26 formed in a high temperature housing 20 made of stainless steel or other food safe material capable of withstanding temperatures ranging from about 500° F. to about 1000° F. The high temperature housing 20 consists of a closed top 24, an open bottom 28 and at least one side wall 22 to form a cooking chamber 26. See FIGS. 1, 4-7, 11 and 12. It is contemplated that the cross section of high temperature housing 20 can be square, rectangular, polygonal or circular. In a preferred embodiment, a front opening 222 is formed in a side wall 22 to allow a user to place or remove food from the cooking chamber 26. See FIGS. 8 and 9. In a preferred embodiment, the front opening 222 can be covered by a door 224.

Figure 6:
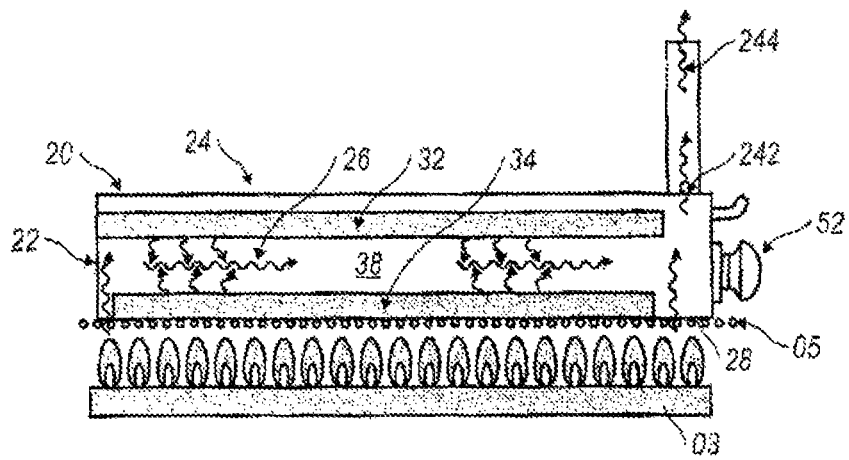
FIG. 6 is a cross section plan view of a removable oven on a grill 05, depicting a cooking chamber 26 in a high temperature housing 20 with a pair of cooking plates 30, and a chimney 244.
Figure 7:
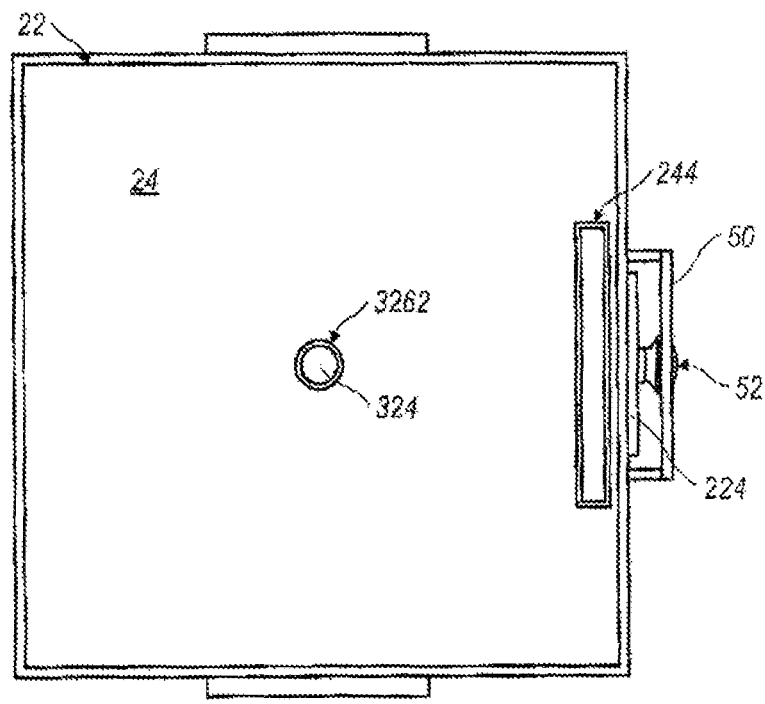
FIG. 7 is a top view of a removable oven depicting a stem 324 protruding through a stem aperture 326 formed in a top housing 24.

As depicted in FIGS. 6 and 14, a lower cooking plate 34 is positioned on the grill 05 inside the open bottom 28. In a preferred embodiment, a repositionable upper cooking plate 32 is located in an upper region 262 of the cooking chamber 26. See FIGS. 5, 6, 8 and 9. The cooking plates 32 and 34 can be square, rectangular, polygonal and/or circular so long as the upper and lower surfaces are flat. The cooking plates 32 and 34 are made from materials that are food safe and with a thickness capable of absorbing and radiating heat at high temperatures as described above. It is contemplated that such cooking plates 32 and 34 are made from ceramic materials, earthenware, stoneware or a combination thereof.

Figure 3:
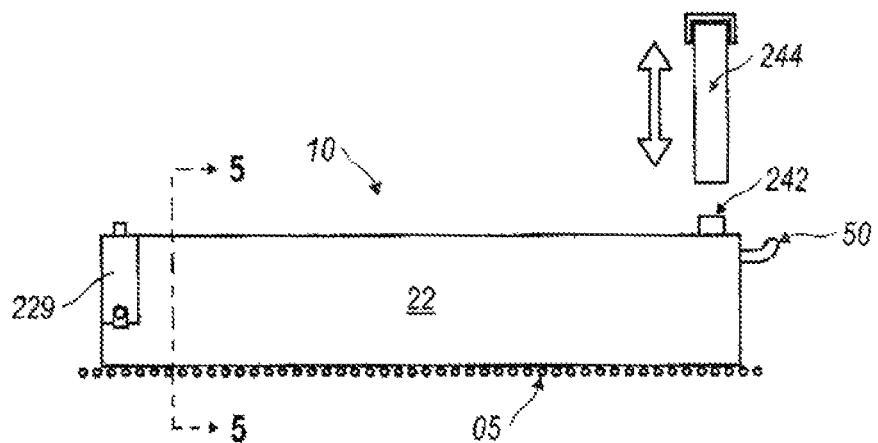
FIG. 3 is a side view of a removable oven depicting the back cover 229, chimney 244 and handle 50.
Figure 4:
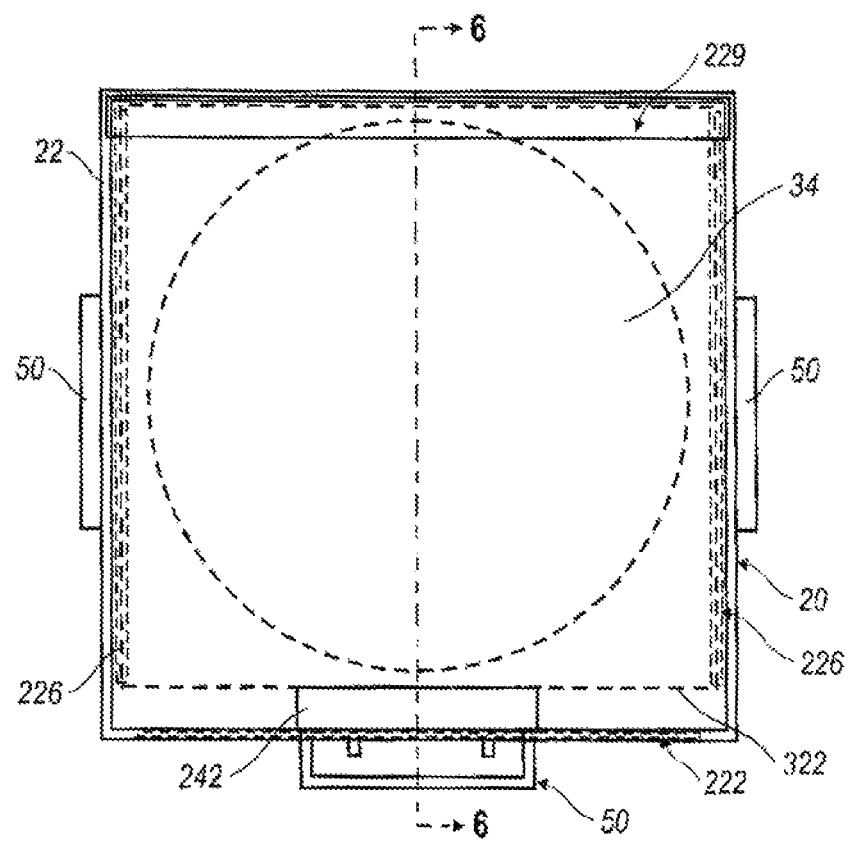
FIG. 4 is a top view of a removable oven depicting a cooking plate 34 within a high temperature housing 20.
Figure 5:
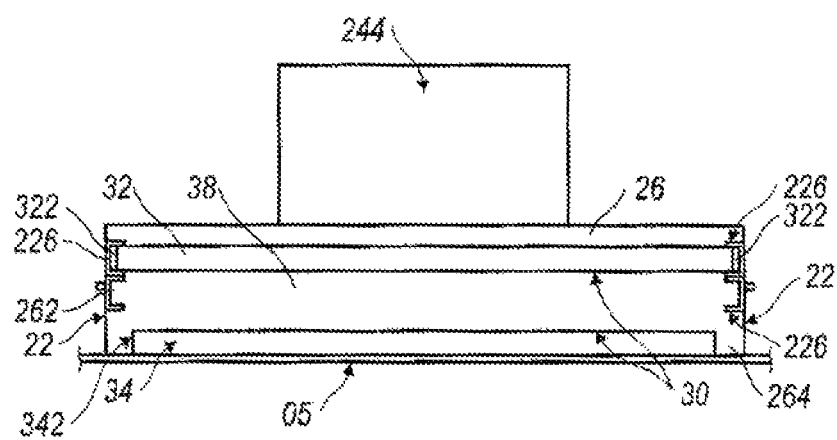
FIG. 5 is a cross section plan view of a removable oven depicting the chimney 244, pair of cooking plates 30 within a cooking chamber 26 and a heated air gap 38.

Whether one or two cooking plates 30, 32, 34 are utilized, each should have a periphery 322 and 342 that are less than the periphery of the cooking chamber 26. A smaller periphery 322 of an upper cooking plate 32 allows the upper cooking plate 32 to be inserted into the high temperature housing 20 through a back opening 228 formed in a side wall 22 and covered by a back cover 229. See FIGS. 3 and 4. A cooking plate 30 or lower cooking plate 34 that is smaller than the open bottom 28 creates an unobstructed space around the periphery 342 of the cooking plate 30 or lower cooking plate 34 thereby allowing heated air to flow into and heat the cooking chamber 26 above the cooking plate 30 and the upper region of the food. See FIGS. 6 and 14. If an upper cooking plate 32 is utilized, then it too is heated by the flow of the heated air in the cooking chamber 26. The lower cooking plate is heated directly by the heat source 03 and or by air heated by the heat source 03.

Figure 22C:
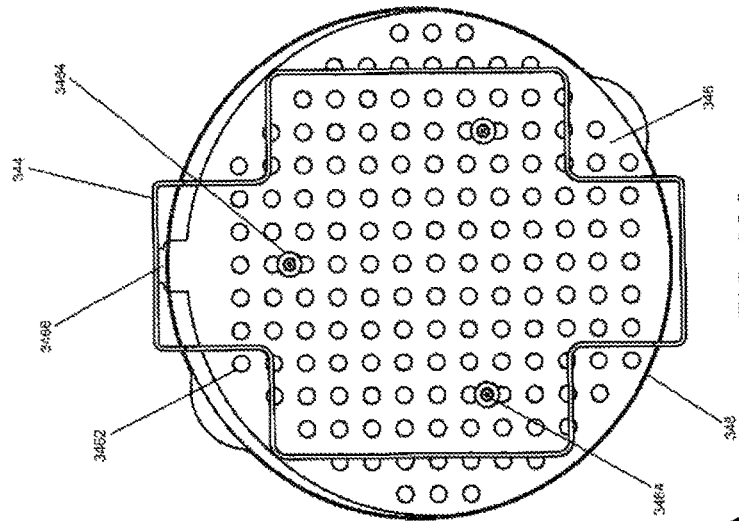
FIGS. 22A through 22C are top views depicting the shutter 346 in various positions above diffuser pan 348.
Figure 22B:
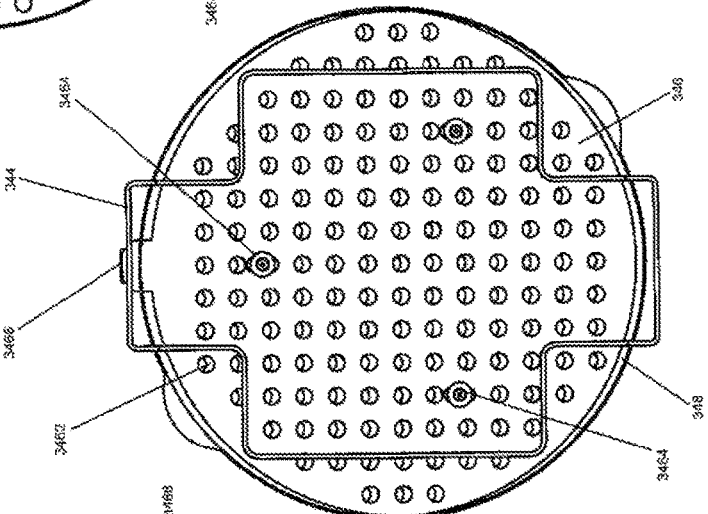
Figure 22A:
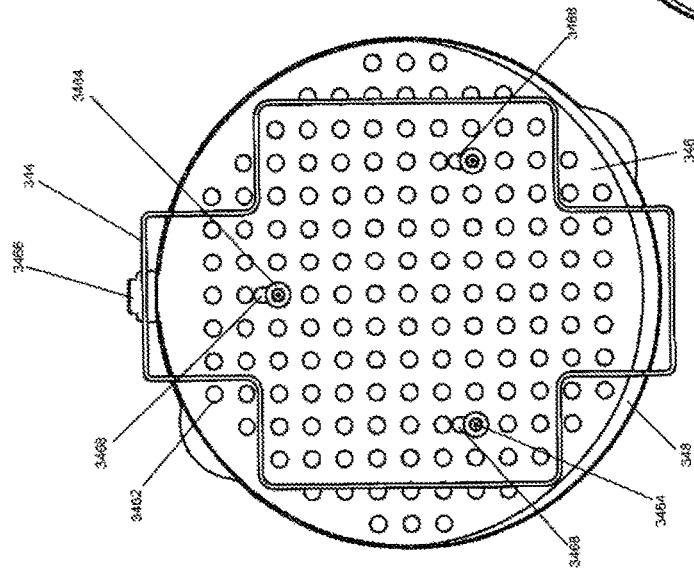

In a preferred embodiment, the cooking plate 30 is supported by at least one adjustable stand 3464 fixed to a perforated diffuser pan 348. See FIGS. 14, 21A, 21B and 21C. A perforated shutter 346 is positioned next to a perforated diffuser pan 348. See FIGS. 12 and 20. Perforated shutter 346 can be positioned above or below perforated diffuser pan 348. The pattern of the shutter perforations 3462 corresponds to the pattern of the diffuser pan perforations 3482 such that shutter 346 can be moved by a tab 3466 to alter the flow of heated air through the perforations 3482 of diffuser pan 348. See FIGS. 21A, 21B and 21C. This can be achieved while cooking plate 30 is supported by at least one adjustable stand 3464 by forming a corresponding stand slot 3468 in perforated shutter 346 for an adjustable stand 3464 to pass through; and forming a tab slot 3484 in perforated diffuser pan 348 for tab 3466 to pass through. See FIGS. 21A, 22B and 22C. In yet another preferred embodiment, a wire frame 344 rests in perforated diffuser pan 348 to allow a user to easily position a cooking plate 30 on or off at least one adjustable stand 3464. See FIG. 20. In a preferred embodiment, adjustable stand 3464 includes a post 34642 coupled to a nut 34644 and boss 34646 fixed to perforated diffuser pan 348. See FIGS. 20, 21A, 21B and 21C. Post 34642 is of sufficient length to pass through boss 34646, nut 34644, perforated diffuser pan 348 and perforated shutter 346 to support cooking plate 30 at various heights above perforated diffuser pan 348. In a preferred embodiment, post 34642 is threaded to boss 34646 and nut 34644. The shutter 346, diffuser pan 348, wire frame 344 and adjustable stand 3464 are made from materials that are food safe and capable of withstanding high temperatures as described above.

It is contemplated that the above described shuttered perforated diffuser pan 348 gives a user control over the flow of heated air from grill 05 into cooking chamber 26. To rapidly heat up cooking chamber 26 and/or upper cooking plate 32, if installed, without rapidly heating cooking plate 30, a user can position shutter 346 by tab 3466 to block the perforations 3482 of diffuser pan 348 thereby shunting heated air away from the bottom of cooking plate 30 to flow past the periphery 342 of cooking plate 30 and upward into cooking chamber 26. A user can adjust the height and inclination of cooking plate 30 above diffuser pan 348 through the use of adjustable stand(s) 3464. A slight inclination of cooking plate 30 can eliminate or at least reduce the pooling of liquids. A user can adjust the height and inclination of cooking plate 30 above diffuser pan 348 through the use of adjustable stand(s) 3464. A slight inclination of cooking plate 30 can eliminate or at least reduce the pooling of liquids. Or if one side of cooking plate 30 is getting hotter due to uneven heat from below, the gap below that side of the cooking plate 30 can be increased to reduce that side temperature. Diffuser pan 348 absorbs heat from the high temperature heat source 03 and transmits such heat evenly to the cooking plate 30. The gap between cooking plate 30 and diffuser pan 348 acts as insulation from high temperature heat source 03. Altering the gap or a portion of the gap between cooking plate 30 and diffuser pan 348 alters the temperature of cooking plate 30. Increasing the gap or a portion of the gap between cooking plate 30 and diffuser pan 348 acts to decrease the temperature of cooking plate 30 or a portion thereof. Decreasing the gap or a portion of the gap between cooking plate 30 and diffuser pan 348 acts to increase the temperature of cooking plate 30 or a portion thereof.

In a preferred embodiment, the upper cooking plate 32 has a larger surface area that the lower cooking plate 34. In one embodiment at least two pair of opposing rails 226 are fixed in the upper region 262 of the cooking chamber 26 to receive and hold the upper cooking plate 32 at pre-determined heights above the lower cooking plate to form a variable heated air gap 38. See FIGS. 5 and 6. In another embodiment, a stem 324 projects upward from the upper repositionable cooking plate and through a stem aperture 326 formed in the closed top 24 and further through a securing boss 3262 fixed to the closed top 24. See FIGS. 8 and 9. In one variation of this embodiment, a plurality of holes 3244 are formed in the stem 324, each with a diameter sufficient to receive a pin 3246 of a sufficient length to rest across the securing boss 3262. See FIG. 8. As can be appreciated, this stem arrangement allows the upper cooking plate 32 to be repositioned to pre-determined heights thereby allowing the heated air gap 38 to be varied. In yet another variation of this embodiment, the stem 324 and the securing boss 3262 are threaded thereby allowing a user to vary the heated air gap 38 as the situation dictates. Varying the heated air gap 38 as described in the embodiments above gives the user a greater degree of control over the cooking temperature between the cooking plates 32 and 34. A thermometer 40 can be positioned on the closed top 24 or a side wall 22 to measure the temperature of the cooking chamber 26, heated air gap 38, chimney or a combination thereof. See FIG. 1.

A chimney 244 is fitted over a chimney opening 242 formed in the closed top 24 of a high temperature housing 20 to alter heating efficiency of the cooking chamber 26 and the air flow through the heated air gap 38. The flow of air through the heated air gap 38 can be varied by covering all or a portion of the chimney 244 with a chimney cover 246.

In a preferred embodiment, chimney 244 is made up of a series of chimney sections 2441 fitted together to a user defined length. See FIGS. 11 through 15. This allows a user to alter the flow of heat through the cooking chamber 26.

Figure 17:
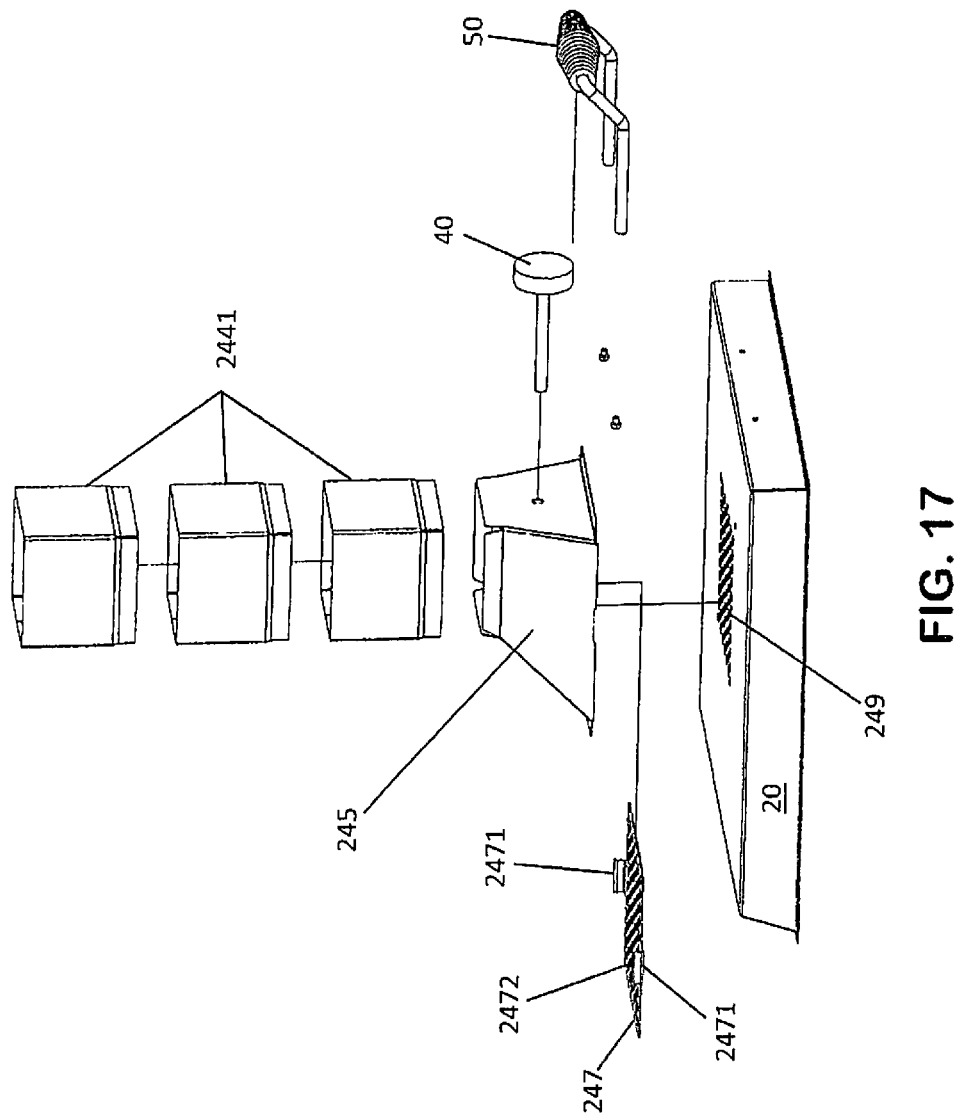
FIG. 17 is an exploded isometric view of a removable oven 10 depicting a high temperature housing 20, chimney base 245, chimney sections 2441, chimney shutter 247, chimney shutter tab 2471 holes 2472, passages 249, thermometer 40 and handles 50.
Figure 19:
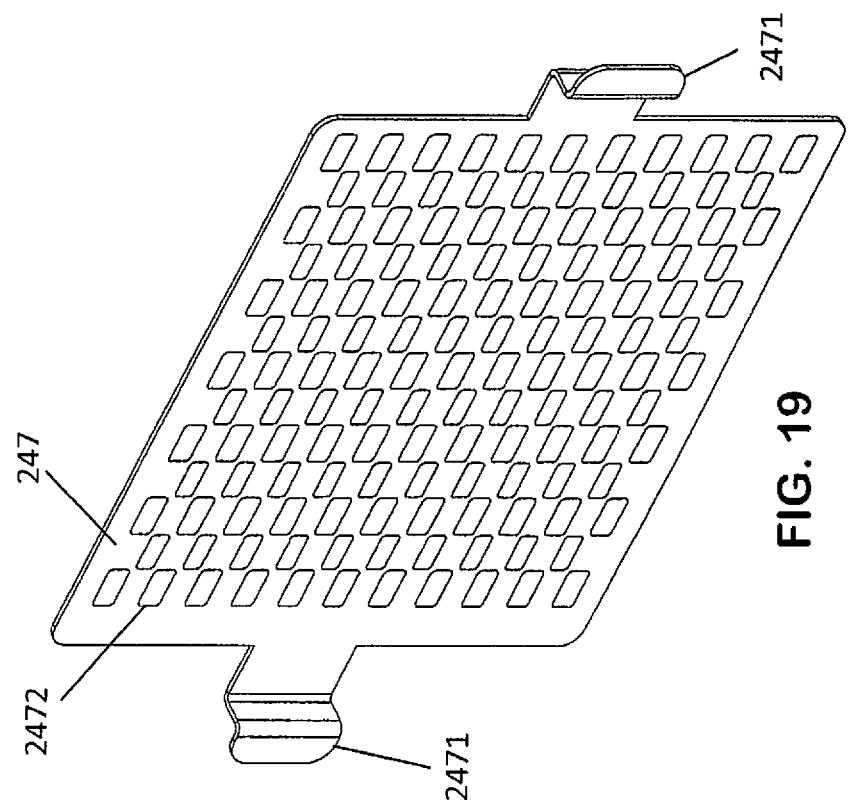
FIG. 19 is an isometric view of a chimney shutter 247 for use with a removable oven 10. A plurality of holes 2472 are depicted in chimney shutter 247. A chimney shutter tab 2471 is also depicted in FIG. 19.
Figure 18:
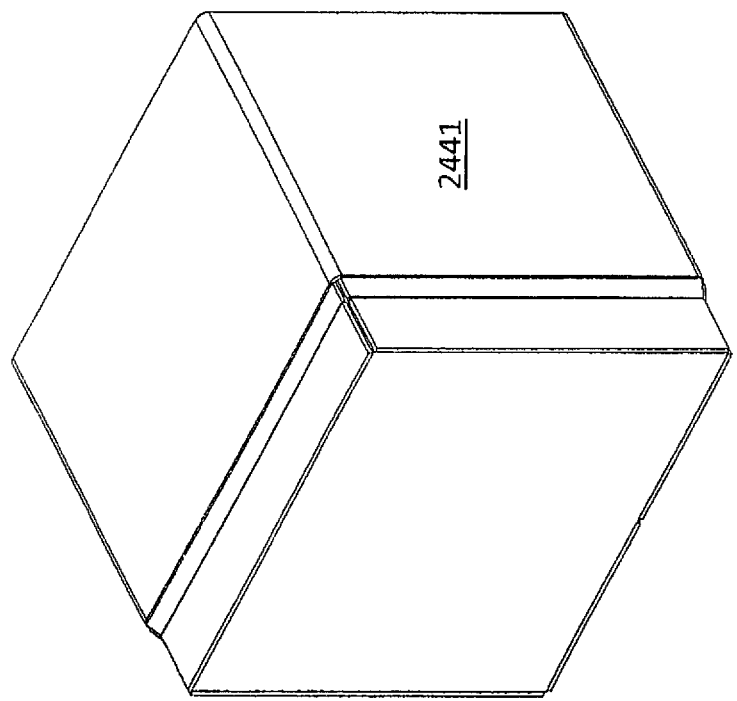
FIG. 18 is an isometric view of a chimney section 2441 for use with a removable oven 10. The chimney section 2441 is on its side.

In a preferred embodiment, a plurality of passages 249 are formed in the closed top 24 of removable oven 10. See FIG. 17. A chimney shutter 247 is positioned next to the plurality of passages 249. A plurality of holes 2472 are formed in chimney shutter 247. See FIG. 17. Chimney shutter 247 can be positioned above or below the plurality of passages 249. The pattern of the holes 2472 corresponds to the pattern of the passages 249 such that chimney shutter 247 can be moved by a chimney shutter tab 2471 to alter the flow of heated air through the passages 249. See FIGS. 16A, 16B and 16C. The plurality of passages 249 and plurality of holes 2472 and the corresponding patterns of each allows for an even flow of heat and hot air over the top of cooking plate 30.

In a preferred embodiment, a chimney base 245 surrounds the plurality of passages 249 and a substantial portion of chimney shutter 247. See FIGS. 15 and 17. The top of chimney base 245 is configured to receive a chimney 244 whether of fixed length or comprising a number of chimney sections 2441. The opening area of chimney base 245 is about equal to the total opening area of the plurality of passage 249. In such a preferred embodiment, a user controls or alters the flow rate of heat or hot air through cooking chamber 26 by altering the length of chimney 244 by adding or removing chimney sections 2441 and/or by altering the flow of heat and hot air through the plurality of passages 249 by adjusting the chimney shutter 247.

Figure 10:
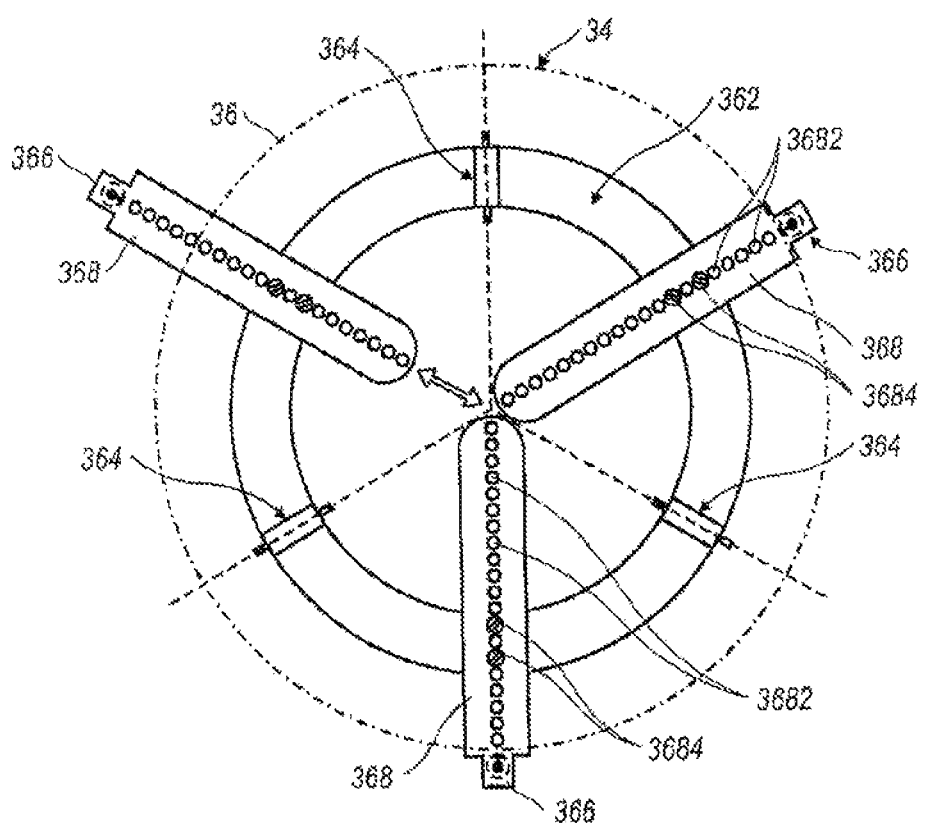
FIG. 10 is a top view of a rotating assembly 36 for a lower cooking plate 34.
Figure 12:
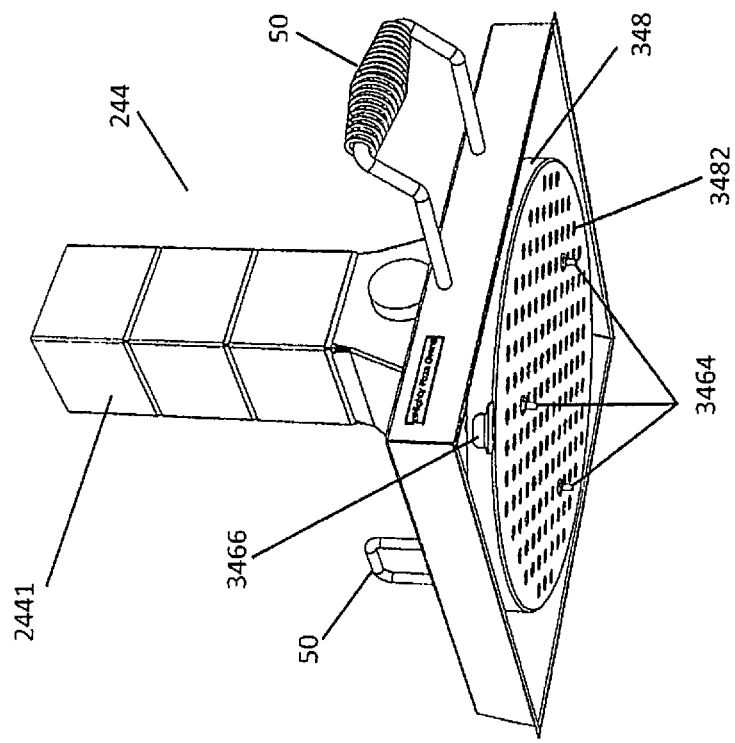
FIG. 12 is an isometric view of a removable oven 10 depicting a high temperature housing 20 with a chimney 244, chimney segments 2441, handles 50, a perforated diffuser pan 348, perforations 3482, adjustable stands 3464, and a diffuser shutter tab 3466.
Figure 11:
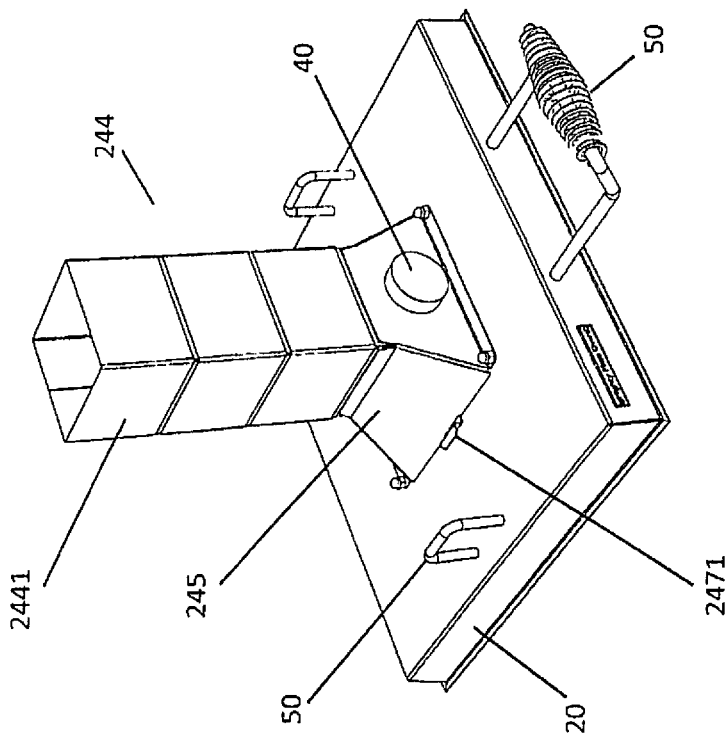
FIG. 11 is an isometric view of a removable oven 10 depicting a high temperature housing 20 with a thermometer 40, chimney 244, chimney sections 2441, chimney base 245, chimney shutter tab 2471, and handles 50.

In a preferred embodiment of the removable oven, the lower cooking plate 34 is capable of rotation by a user. Rotation is achieved by positioning the lower cooking plate 34 upon a rotating assembly 36 that is in contact with grill 05. The lower cooking plate 34 rests upon at least three base rollers 364 fixed to and above a frame base 362. See FIG. 10. The base rollers 364 are equidistant from each other and in contact with a lower surface of the lower cooking plate 34. The lower cooking plate 34 is kept positioned upon the base rollers 364 by at least three equidistant side rollers 366 fixed to and above the frame base 362 by at least three struts 368, one for each side roller 366. See FIG. 10. The side rollers 366 are in contact with a periphery of the lower cooking plate 34. A plurality of strut holes 3682 are formed along the longitudinal axis of each strut 368 to receive a removable securing pin 3684. See FIG. 10. At least two corresponding holes are formed in the frame base 362, each capable of receiving a removable securing pin 3684. The strut 368, strut holes 3682 and securing pin 3684 arrangement allows a user to adjust the side roller 366 in or out from the center of the rotating assembly 36 to accommodate the size of the lower cooking plate 34. In a preferred embodiment, six securing pins 3684, two for each strut 368, are used to secure each strut 368 to the frame base 362. See FIG. 10. In a preferred embodiment, each securing pin 3684 is of sufficient length to extend below the grill 05 and between the gaps between adjacent grill bars to provide a stop 3686 that prevents the frame base 362 from excessive lateral movement upon grill 05. In another embodiment, a stop 3686 extends away from the bottom of frame base 362 fitting between a gap between adjacent grill bars. The frame base 362, rollers 364 and 366, struts 368, securing pins 3684 and stops 3686 are made of high temperature materials similar to the high temperature housing 22 or the cooking plates 34. The user can rotate the lower cooking plate 34 by a high temperature utensil 07 passing through the front opening 222 and pushing (or pulling) the periphery of the lower cooking plate 34.

As depicted in FIG. 1, handles 50 can be mounted on the sides of the high temperature housing to allow for easy of transportation to/from the grill 05. It is contemplated that a knob 52 can be mounted on the door 224 to for ease of use of the door 224. In a preferred embodiment, the knob 52 is insulated. It is further contemplated that a handle 50 can be mounted on the side wall 22 above the front opening 222 to allow the high temperature housing to be swung up to expose the lower cooking plate 38. See FIG. 1.

Figure 23:
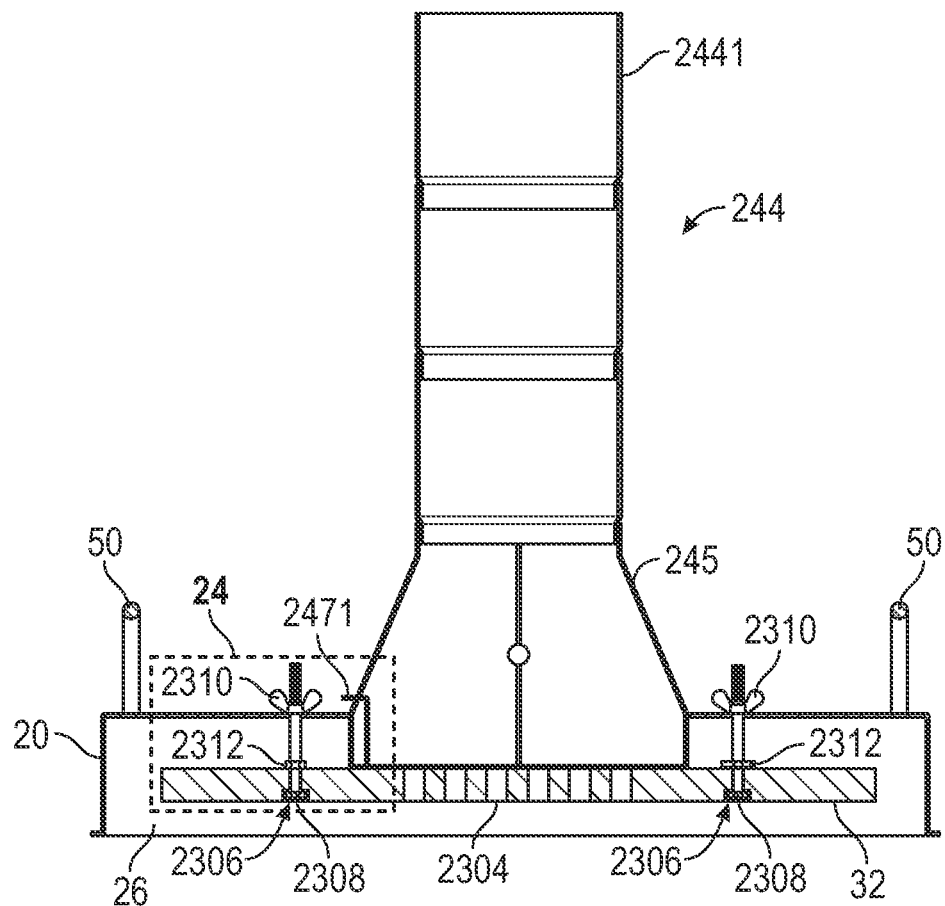
FIG. 23 is a cross-section elevation-view depicting another embodiment that includes a chimney placed over an opening of the housing, which corresponds to perforations in an adjustable upper cooking plate.
Figure 24:
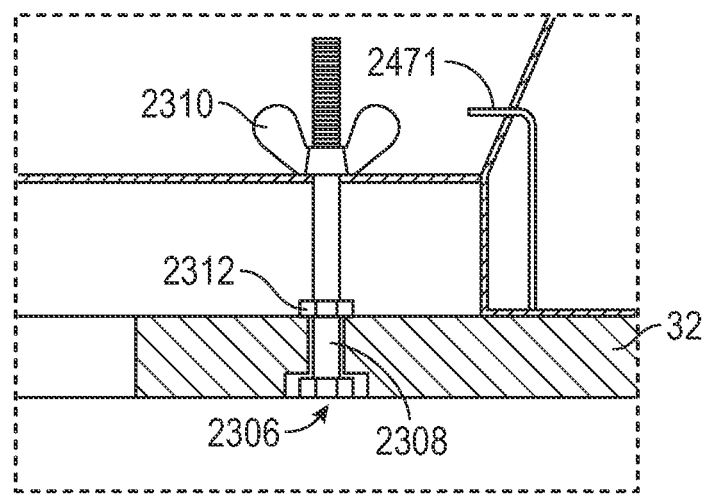
FIG. 24 is an enlarged view of a section of the adjustable upper cooking plate in FIG. 23.
Figure 25:
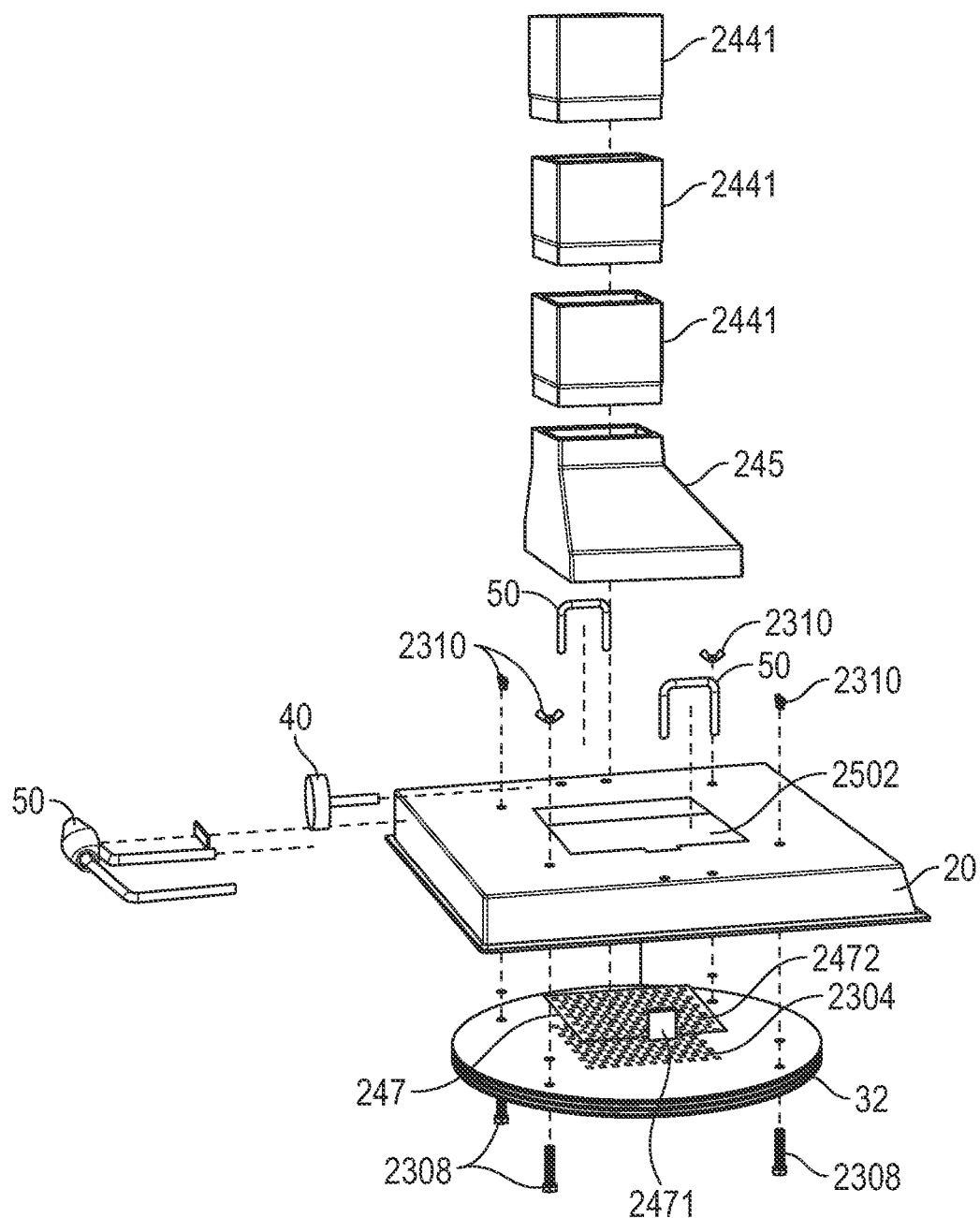
FIG. 25 is an exploded view of the embodiment depicted in FIG. 23.

Referring now to FIGS. 23-25, a chimney 244 with base 245 and sections 2441 sit atop an upper cooking plate 32 and go through opening 2502 of a high temperature housing 20. Upper cooking plate 32 that has perforations 2304 and two sets of adjustable support components, one on each side of the chimney, that each include an inset 2306 for receipt of a bolt 2308 that is secured to the upper cooking plate by a nut 2312. A wing nut 2310 attached to each bolt 2308, which passes through the top of the high temperature housing 20, allows for the upper cooking plate 32 to be raised or lowered. In this manner, the height of the upper cooking plate 32 can be varied and heat flow is forced to go through upper cooking plate 32 perforation 2304 regardless of the heat of the upper cooking plate 32 in the high temperature housing 20. The perforations 2304 in the upper cooking plate 32 allow diffusion of exhaust materials while minimizing heat loss from the cooking chamber 26. In this embodiment, the perforations 2304 are in a pattern to correspond to the pattern of passages 2472 of the chimney shutter 247. The user controls or alters the flow rate of heat or hot air through cooking chamber 26 by altering the length of chimney 244, by adding or removing chimney sections 2441 and/or by altering the flow of heat and hot air by adjusting the chimney shutter 247 using the chimney shutter tab 2471. Handles 50 can be mounted on the sides of the high temperature housing 20 to allow for easy transportation. And, a thermometer 40 can be positioned to measure the temperature of the cooking chamber 26.

Referring now to FIGS. 26-27, a wire frame 344 rests in a solid diffuser pan 2601 supported by a plurality of stands 2602 having a predetermined height in FIG. 26 or a plurality of stands 2702 having another predetermined height in FIG. 27. The plurality of stands enables the diffuser pan 2601 to be raised off a cooking surface by a half inch in FIG. 26 or, optionally, higher as depicted in FIG. 27 by adding additional lengths to the plurality of stands. In addition, the diffuser pan 2601 includes a corresponding plurality of openings for receipt of a respective T-Nut 34644. An adjustable screw 34642 passes through each respective T-Nut 34644 and is adjustably secured therein by a respective nut 34646. In this manner, each adjustable screw 34642 may be used to adjust the height of the lower cooking plate 34 inside the diffuser pan 2601. Each of the plurality of stands 2602, 2702 is threadably connected to a respective adjustable screw 34642. Any number of a plurality of stands (e.g. 3,4,5) may be used to raise the diffuser pan 2601 off a cooking surface at various heights.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. An adjustable cooking plate comprising:
   a diffuser pan supported by at least one stand on a cooking grill, each stand having a predetermined height and threadably connected to a respective adjustable screw;
   at least one adjustable screw coupled to and projecting away from said diffuser pan for supporting the cooking plate and adjusting a height of the cooking plate inside the diffuser pan; and
   wherein each screw includes a respective nut passing through said diffuser pan for coupling each screw to the diffuser pan.

2. The adjustable cooking plate of claim 1, further comprising at least three stands.

3. The adjustable cooking plate of claim 1, wherein each stand comprises an extension piece for adjusting the predetermined height.

* * * * *